No. 832,984. PATENTED OCT. 9, 1906.
J. LAIDLAW & J. W. MACFARLANE.
FRICTION CLUTCH.
APPLICATION FILED MAR. 2, 1906.
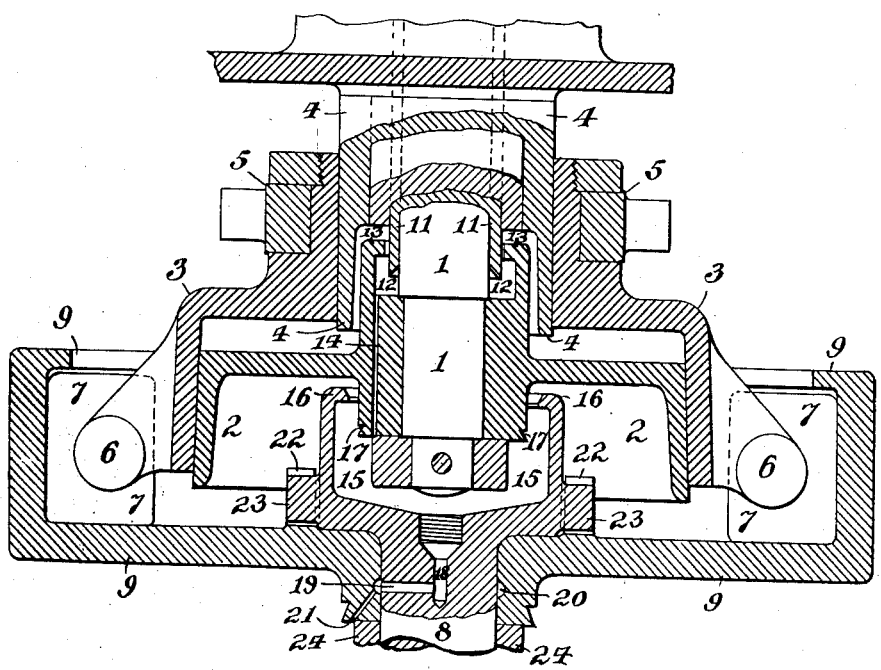
Attest:
Inventors
John Laidlaw
James Wright Macfarlane
by Howson and Howson Att'ys.

UNITED STATES PATENT OFFICE.

JOHN LAIDLAW AND JAMES WRIGHT MACFARLANE, OF GLASGOW, SCOTLAND.

FRICTION-CLUTCH.

No. 832,984.  Specification of Letters Patent.  Patented Oct. 9, 1906.

Application filed March 2, 1906. Serial No. 303,847.

*To all whom it may concern:*

Be it known that we, JOHN LAIDLAW and JAMES WRIGHT MACFARLANE, subjects of the King of Great Britain and Ireland, and residents of Glasgow, Scotland, (whose postal address is 98 Dundas street, Kingston, Glasgow, Scotland,) have invented certain new and useful Improvements in Friction-Clutches, of which the following is a specification.

This invention relates to friction-clutches of the type in which the adhesion between the two members of the clutch is attained by centrifugal force, and has for its object by combining with what may be termed the "centrifugal" member another clutch either of positive or frictional type to produce a simple and effective engaging and disengaging device easily put into operation without shock and equally easily withdrawn. This combination is designed with more particular reference to driving centrifugal machines directly by electric motors, so as to permit of the motor running continuously, and the centrifugal machine being connected thereto or disconnected therefrom when it is desired to start or stop the latter; but it is also applicable for any other purpose where such a combination of clutches is of advantage.

Our invention has further for its object to arrange for adequate lubrication of both the motor and the centrifugal-machine spindle, while at the same time preventing the possibility of the lubricant getting access to the frictional surfaces of the clutch and rendering them ineffective, a matter very essential to the practicability of such a combination, more particularly in view of the high rotary speed at which centrifugal machines are operated.

Since our invention consists, essentially, in combining with any suitable known type of centrifugal clutch an additional (positive or frictional) clutch (which may also be of any suitable type) for throwing the centrifugal member into gear, it is obvious that its carrying into effect may be considerably varied; but in order that our invention and the manner of performing the same may be properly understood we hereunto append an explanatory drawing, showing in sectional elevation an example of a clutch applied in the driving of a centrifugal machine by an electric motor. In this example the driving-spindle 1—that is, the shaft of the electric motor—carries one member 2 of an ordinary counterpart conical friction-clutch. The other member 3 of this clutch rides upon a sleeve 4, formed upon part of the housing of the machine. The member 3 is provided with a muff and stirrup-ring 5 for sliding it longitudinally upon the sleeve 4. Upon the outside of the member 3 there are formed four paws 6, which enter between four loose segmental centrifugal slipper-blocks 7, forming one member of the centrifugal clutch. The slipper-blocks 7 are carried within a drum 9, which has driving connection with the spindle 8 of the centrifugal machine and which forms the second member of the centrifugal clutch.

In operation (the motor-spindle 1 being continuously driven) the two members 2 3 are brought into gear by longitudinal movement of the member 3. Rotation of the member 3 is thereby started as gradually as may be desired. Rotation of this member 3 causes in its turn the slipper-blocks 7 to be rotated within the drum 9, and the centrifugal force developed by their rotation causes them to engage the inner surface of that drum, slowly starting its rotation, and so the rotation of the spindle 8, the effect being cumulative and very gradual, so that the starting of the spindle 8 is extremely gradual and free from shock. The clutch-drum 9 drives the spindle 8 through jaws 22 upon it engaging lugs 23, formed upon the outside of the enlarged upper end of the spindle, and is held in position between the under side of that part and the top surface of a sleeve 24, forming part of the bearing of the spindle 8 of the centrifugal machine. Lubrication is provided for by the following improved arrangement of parts which permits of adequate lubrication of the spindles, while preventing the lubricant destroying the effective action of the clutch, and which consists of a cup 12, into which lubricant escaping from between the spindle 1 and a sleeve 11, forming part of the spindle-supporting bearing, finds its way and from which its discharge by centrifugal force is prevented by an inwardly-projecting flange 13. From thence the lubricant passes through the boss 2 by a passage 14 to a cup 15, formed in the enlarged end of the spindle 8 and provided with an inwardly-projecting flange 16, a lip 17 being formed on the boss 2 to prevent upward creeping of the lubricant. When the spindle 8 is stationary, lubricant flows from the cup 15 through a central aperture 18 (which also serves to receive an eyebolt for lifting the spindle) and a radial passage 19 to a groove 20 and from the groove through a passage 21 and from thence to the bearings (not shown) of the spindle 8.

Instead of the additional clutch—that is, the members 2 3—being of the type shown any other convenient form of friction-clutch may be used, or instead of a friction-clutch any form of positive or jaw clutch may be used; but in this case the advantage of very gradual acceleration of the centrifugal clutch and of the spindle 8 is modified to what is obtained by the use of the centrifugal clutch alone.

Instead of the precise form of centrifugal clutch shown and described being used any other alternative form of centrifugal clutch may be used, the essential feature of the device being the combination, with a centrifugal clutch, of an additional clutch for throwing the centrifugal member of the centrifugal clutch into or out of gear.

It is clear that the improved clutch may be applied to purposes other than the driving of centrifugal machines.

What we claim is—

1. A clutch for connecting and disconnecting an intermittently-running shaft to or from a continuously-running shaft and comprising coöperating members forming a centrifugal clutch and both of which members when the clutch is disengaged are disconnected from the continuously-running shaft and an additional clutch for connecting one of the centrifugal members to the said shaft, and means for operating the clutch, as described.

2. A clutch for connecting and disconnecting an intermittently-running shaft to or from a continuously-running shaft and comprising a centrifugal-machine spindle, a drum affixed thereto, slipper-blocks loose within the drum, an externally-conical member fixed on the continuously-running shaft, an internally-conical longitudinally-movable member embracing said member and shaft; paws on the movable member entering between the loose slipper-blocks and means for engaging the movable conical member with its counterpart, as described.

3. A clutch for connecting and disconnecting an intermittently-running shaft to or from a continuously-running shaft and comprising a drum fixed to the intermittently-running shaft, slipper-blocks loose within the drum, a clutch member fixed on the continuously-running shaft, a counterpart member adapted to be engaged with the member on the latter shaft, paws on the counterpart member engaging the slipper-blocks and means for connecting and disconnecting the members, as described.

4. A clutch for connecting and disconnecting an intermittently-running shaft to or from a continuously-running shaft and comprising a drum fixed to the intermittently-running shaft, slipper-blocks loose within the drum, an externally-conical centrally-bossed member fixed on the continuously-running shaft, an internally-conical longitudinally-movable member embracing said member and shaft; paws on the movable member entering between the loose slipper-blocks, means for engaging the movable conical member with its fixed bossed counterpart member, a lubricant-retaining chamber in the upper part of the boss of the said member, a lubricant-duct from said chamber passing down through said boss, and a like lubricant chamber and duct formed in the top of the intermittently-running shaft and into which lubricant is discharged from the first-mentioned chamber, as described.

In testimony whereof we have signed our names to this specification in the presence of two subscribing witnesses.

JOHN LAIDLAW.
JAMES WRIGHT MACFARLANE.

Witnesses:
JAMES EAGLESOM,
FRED. MIDDLETON.